(12) United States Patent
Stewart

(10) Patent No.: US 12,235,038 B2
(45) Date of Patent: *Feb. 25, 2025

(54) TRIM BREAKER FOR A STRUCTURAL CABINET THAT INCORPORATES A STRUCTURAL GLASS CONTACT SURFACE

(71) Applicant: WHIRLPOOL CORPORATION, Benton Harbor, MI (US)

(72) Inventor: Aaron M. Stewart, Buchanan, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,750

(22) Filed: Nov. 7, 2022

(65) Prior Publication Data

US 2023/0066715 A1 Mar. 2, 2023

Related U.S. Application Data

(62) Division of application No. 17/126,134, filed on Dec. 18, 2020, now Pat. No. 11,543,172, which is a division of application No. 16/278,408, filed on Feb. 18, 2019, now Pat. No. 10,907,891.

(51) Int. Cl.
*F25D 23/08* (2006.01)

(52) U.S. Cl.
CPC ........ *F25D 23/085* (2013.01); *F25D 2400/10* (2013.01)

(58) Field of Classification Search
CPC ...... F25D 23/085; F25D 23/062; F25D 11/00; F25D 2400/00

USPC .................................................. 220/592.06
See application file for complete search history.

(56) References Cited

U.S. PATENT DOCUMENTS

| 1,849,369 A | 3/1932 | Frost |
| 1,921,576 A | 8/1933 | Muffly |
| 2,191,659 A | 2/1940 | Hintze |
| 2,464,526 A | 10/1945 | Palmer |
| 2,432,042 A | 12/1947 | Richard |
| 2,451,884 A | 10/1948 | Stelzer |

(Continued)

FOREIGN PATENT DOCUMENTS

| CA | 626838 A | 5/1961 |
| CN | 201748744 U | 2/2011 |

(Continued)

OTHER PUBLICATIONS

Cai et al., "Generation of Metal Nanoparticles by Laser Ablation of Microspheres," J. Aerosol Sci., vol. 29, No. 5/6 (1998), pp. 627-636.

(Continued)

*Primary Examiner* — Stephen J Castellano
(74) *Attorney, Agent, or Firm* — Price Heneveld LLP

(57) ABSTRACT

A refrigerating appliance includes an inner liner, an outer wrapper and a trim breaker extending between the inner liner and the outer wrapper to define an insulating cavity therebetween. The trim breaker includes a liner portion coupled with the inner liner, a wrapper portion coupled to the outer wrapper and an outer glazing member that extends between the liner and wrapper portions. An external surface of the outer glazing member defines a contact surface that is configured to receive a seal of an operable panel in a closed position.

18 Claims, 8 Drawing Sheets

(56) References Cited

U.S. PATENT DOCUMENTS

| | | | |
|---|---|---|---|
| 2,644,605 A | 7/1953 | Palmer | |
| 2,729,863 A | 1/1956 | Kurtz | |
| 2,792,959 A | 5/1957 | Diamond et al. | |
| 2,809,764 A | 10/1957 | Diamond | |
| 2,951,609 A | 9/1960 | Donnelly | |
| 3,165,221 A | 1/1965 | Kasady | |
| 3,290,893 A | 12/1966 | Haldopoulos | |
| 3,338,451 A | 8/1967 | Kesling | |
| 3,353,301 A | 11/1967 | Heilweil et al. | |
| 3,353,321 A | 11/1967 | Heilweil et al. | |
| 3,408,316 A | 10/1968 | Mueller et al. | |
| 3,597,850 A | 8/1971 | Jenkins | |
| 3,607,169 A | 9/1971 | Coxe | |
| 3,632,012 A | 1/1972 | Kitson | |
| 3,633,783 A | 1/1972 | Aue | |
| 3,634,971 A | 1/1972 | Kesling | |
| 3,670,521 A | 6/1972 | Dodge, III et al. | |
| 3,768,687 A | 10/1973 | Spencer | |
| 3,769,770 A | 11/1973 | Deschamps et al. | |
| 3,862,880 A | 1/1975 | Feldman | |
| 3,868,829 A | 3/1975 | Mann et al. | |
| 3,875,683 A | 4/1975 | Waters | |
| 3,910,658 A | 10/1975 | Lindenschmidt | |
| 3,915,328 A | 10/1975 | Hawes et al. | |
| 3,933,398 A | 1/1976 | Haag | |
| 3,935,787 A | 2/1976 | Fisher | |
| 4,005,919 A | 2/1977 | Hoge et al. | |
| 4,118,266 A | 10/1978 | Kerr | |
| 4,134,518 A * | 1/1979 | Menchen | F25D 23/085 |
| | | | 220/592.06 |
| 4,170,391 A | 10/1979 | Bottger | |
| 4,180,297 A | 12/1979 | Abrams | |
| 4,242,241 A | 12/1980 | Rosen et al. | |
| 4,260,876 A | 4/1981 | Hochheiser | |
| 4,303,730 A | 12/1981 | Torobin | |
| 4,303,732 A | 12/1981 | Torobin | |
| 4,330,310 A | 5/1982 | Tate, Jr. et al. | |
| 4,396,362 A | 8/1983 | Thompson et al. | |
| 4,529,368 A | 7/1985 | Makansi | |
| 4,583,796 A | 4/1986 | Nakajima et al. | |
| 4,681,788 A | 7/1987 | Barito et al. | |
| 4,732,432 A | 3/1988 | Keil et al. | |
| 4,776,141 A * | 10/1988 | Powell | E04D 13/031 |
| | | | 52/72 |
| 4,781,968 A | 11/1988 | Kellerman | |
| 4,865,875 A | 9/1989 | Kellerman | |
| 4,870,735 A | 10/1989 | Jahr et al. | |
| 4,914,341 A | 4/1990 | Weaver et al. | |
| 4,951,652 A | 8/1990 | Silva et al. | |
| 5,076,984 A | 12/1991 | Bisplinghoff et al. | |
| 5,084,320 A | 1/1992 | Barito et al. | |
| 5,094,899 A | 3/1992 | Rusek, Jr. | |
| 5,121,593 A | 6/1992 | Forslund | |
| 5,168,674 A | 12/1992 | Molthen | |
| 5,171,346 A | 12/1992 | Hallett | |
| 5,227,245 A | 7/1993 | Brands et al. | |
| 5,251,455 A | 10/1993 | Cur et al. | |
| 5,269,099 A | 12/1993 | Kennedy et al. | |
| 5,284,023 A | 2/1994 | Silva et al. | |
| 5,368,381 A | 11/1994 | Mandel | |
| 5,375,428 A | 12/1994 | LeClear et al. | |
| 5,500,287 A | 3/1996 | Henderson | |
| 5,500,305 A | 3/1996 | Bridges et al. | |
| 5,505,810 A | 4/1996 | Kirby et al. | |
| 5,509,248 A | 4/1996 | Dellby et al. | |
| 5,532,034 A | 7/1996 | Kirby et al. | |
| 5,533,311 A | 7/1996 | Tirrell et al. | |
| 5,599,081 A | 2/1997 | Revlett et al. | |
| 5,600,966 A | 2/1997 | Valence et al. | |
| 5,704,107 A | 1/1998 | Schmidt et al. | |
| 5,768,837 A | 6/1998 | Sjoholm | |
| 5,792,539 A | 8/1998 | Hunter | |
| 5,792,801 A | 8/1998 | Tsuda et al. | |
| 5,826,780 A | 10/1998 | Nesser et al. | |
| 5,834,126 A | 11/1998 | Sheu | |
| 5,866,247 A | 2/1999 | Klatt et al. | |
| 5,876,104 A | 3/1999 | Kunkel et al. | |
| 5,918,478 A | 7/1999 | Bostic et al. | |
| 5,934,085 A | 8/1999 | Suzuki et al. | |
| 5,950,395 A | 9/1999 | Takemasa et al. | |
| 5,952,404 A | 9/1999 | Simpson et al. | |
| 6,013,700 A | 1/2000 | Asano et al. | |
| 6,029,846 A | 2/2000 | Hirath et al. | |
| 6,037,033 A | 3/2000 | Hunter | |
| 6,063,471 A | 5/2000 | Dietrich et al. | |
| 6,163,976 A | 12/2000 | Tada et al. | |
| 6,164,739 A | 12/2000 | Schultz et al. | |
| 6,187,256 B1 | 2/2001 | Aslan et al. | |
| 6,209,342 B1 | 4/2001 | Banicevic et al. | |
| 6,210,625 B1 | 4/2001 | Matsushita et al. | |
| 6,217,140 B1 | 4/2001 | Hirath et al. | |
| 6,244,458 B1 | 6/2001 | Frysinger et al. | |
| 6,266,941 B1 | 7/2001 | Nishimoto | |
| 6,266,970 B1 | 7/2001 | Nam et al. | |
| 6,294,595 B1 | 9/2001 | Tyagi et al. | |
| 6,336,693 B1 | 1/2002 | Nishimoto | |
| 6,428,130 B1 | 8/2002 | Banicevic et al. | |
| 6,430,780 B1 | 8/2002 | Kim et al. | |
| 6,485,122 B2 * | 11/2002 | Wolf | F25D 23/085 |
| | | | 220/592.06 |
| 6,519,919 B1 | 2/2003 | Takenouchi et al. | |
| 6,629,429 B1 | 10/2003 | Kawamura et al. | |
| 6,655,766 B2 | 12/2003 | Hodges | |
| 6,689,840 B1 | 2/2004 | Eustace et al. | |
| 6,736,472 B2 | 5/2004 | Banicevic | |
| 6,860,082 B1 | 3/2005 | Yamamoto et al. | |
| 7,008,032 B2 | 3/2006 | Chekal et al. | |
| 7,197,792 B2 | 4/2007 | Moon | |
| 7,197,888 B2 | 4/2007 | LeClear et al. | |
| 7,207,181 B2 | 4/2007 | Murray et al. | |
| 7,234,247 B2 | 6/2007 | Maguire | |
| 7,263,744 B2 | 9/2007 | Kim et al. | |
| 7,360,371 B2 | 4/2008 | Feinauer et al. | |
| 7,475,562 B2 | 1/2009 | Jackovin | |
| 7,517,031 B2 | 4/2009 | Laible | |
| 7,614,244 B2 | 11/2009 | Venkatakrishnan et al. | |
| 7,665,326 B2 | 2/2010 | LeClear et al. | |
| 7,703,217 B2 | 4/2010 | Tada et al. | |
| 7,703,824 B2 | 4/2010 | Kittelson et al. | |
| 7,757,511 B2 | 7/2010 | LeClear et al. | |
| 7,794,805 B2 | 9/2010 | Aumaugher et al. | |
| 7,845,745 B2 | 12/2010 | Gorz et al. | |
| 7,938,148 B2 | 5/2011 | Carlier et al. | |
| 7,939,179 B2 | 5/2011 | DeVos et al. | |
| 7,992,257 B2 | 8/2011 | Kim | |
| 8,049,518 B2 | 11/2011 | Wern et al. | |
| 8,074,469 B2 | 12/2011 | Hamel et al. | |
| 8,079,652 B2 | 12/2011 | Laible et al. | |
| 8,083,985 B2 | 12/2011 | Luisi et al. | |
| 8,108,972 B2 | 2/2012 | Bae et al. | |
| 8,157,338 B2 | 4/2012 | Seo et al. | |
| 8,162,415 B2 | 4/2012 | Hagele et al. | |
| 8,182,051 B2 | 5/2012 | Aible et al. | |
| 8,197,019 B2 | 6/2012 | Kim | |
| 8,266,923 B2 | 9/2012 | Bauer et al. | |
| 8,382,219 B2 | 2/2013 | Hottmann et al. | |
| 8,434,317 B2 | 5/2013 | Besore | |
| 8,439,460 B2 | 5/2013 | Laible et al. | |
| 8,486,215 B2 | 7/2013 | Amann | |
| 8,491,070 B2 | 7/2013 | Davis et al. | |
| 8,516,845 B2 | 8/2013 | Wuesthoff et al. | |
| 8,590,992 B2 | 11/2013 | Lim et al. | |
| 8,717,029 B2 | 5/2014 | Chae et al. | |
| 8,752,921 B2 | 6/2014 | Gorz et al. | |
| 8,763,847 B2 | 7/2014 | Mortarotti | |
| 8,764,133 B2 | 7/2014 | Park et al. | |
| 8,776,390 B2 | 7/2014 | Hanaoka et al. | |
| 8,840,204 B2 | 9/2014 | Bauer et al. | |
| 8,871,323 B2 | 10/2014 | Kim et al. | |
| 8,881,398 B2 | 11/2014 | Hanley et al. | |
| 8,905,503 B2 | 12/2014 | Sahasrabudhe et al. | |
| 8,943,770 B2 | 2/2015 | Sanders et al. | |
| 8,944,541 B2 | 2/2015 | Allard et al. | |
| 9,009,969 B2 | 4/2015 | Choi et al. | |

(56) References Cited

U.S. PATENT DOCUMENTS

| | | | |
|---|---|---|---|
| RE45,501 E | 5/2015 | Maguire | |
| 9,056,952 B2 | 6/2015 | Eilbracht et al. | |
| 9,062,480 B2 | 6/2015 | Litch | |
| 9,074,811 B2 | 7/2015 | Korkmaz | |
| 9,080,808 B2 | 7/2015 | Choi et al. | |
| 9,102,076 B2 | 8/2015 | Doshi et al. | |
| 9,103,482 B2 | 8/2015 | Fujimori et al. | |
| 9,125,546 B2 | 9/2015 | Kleemann et al. | |
| 9,140,480 B2 | 9/2015 | Kuehl et al. | |
| 9,140,481 B2 | 9/2015 | Cur et al. | |
| 9,170,045 B2 | 10/2015 | Oh et al. | |
| 9,170,046 B2 | 10/2015 | Jung et al. | |
| 9,188,382 B2 | 11/2015 | Kim et al. | |
| 8,955,352 B2 | 12/2015 | Lee et al. | |
| 9,221,210 B2 | 12/2015 | Wu et al. | |
| 9,228,386 B2 | 1/2016 | Thielmann et al. | |
| 9,267,727 B2 | 2/2016 | Lim et al. | |
| 9,303,915 B2 | 4/2016 | Kim et al. | |
| 9,328,951 B2 | 5/2016 | Shin et al. | |
| 9,353,984 B2 | 5/2016 | Kim et al. | |
| 9,410,732 B2 | 8/2016 | Choi et al. | |
| 9,423,171 B2 | 8/2016 | Betto et al. | |
| 9,429,356 B2 | 8/2016 | Kim et al. | |
| 9,448,004 B2 | 9/2016 | Kim et al. | |
| 9,463,917 B2 | 10/2016 | Wu et al. | |
| 9,482,463 B2 | 11/2016 | Choi et al. | |
| 9,506,689 B2 | 11/2016 | Carbajal et al. | |
| 9,518,777 B2 | 12/2016 | Lee et al. | |
| 9,568,238 B2 | 2/2017 | Kim et al. | |
| D781,641 S | 3/2017 | Incukur | |
| D781,642 S | 3/2017 | Incukur | |
| 9,605,891 B2 | 3/2017 | Lee et al. | |
| 9,696,085 B2 | 7/2017 | Seo et al. | |
| 9,702,621 B2 | 7/2017 | Cho et al. | |
| 9,759,479 B2 | 9/2017 | Ramm et al. | |
| 9,777,958 B2 | 10/2017 | Choi et al. | |
| 9,791,204 B2 | 10/2017 | Kim et al. | |
| 9,833,942 B2 | 12/2017 | Wu et al. | |
| 9,927,169 B2 | 3/2018 | Baker et al. | |
| 10,024,544 B2 | 7/2018 | Bhogal et al. | |
| 10,077,342 B2 | 9/2018 | An et al. | |
| 10,907,891 B2 | 2/2021 | Stewart | |
| 11,543,172 B2 * | 1/2023 | Stewart | F25D 23/085 |
| 2002/0004111 A1 | 1/2002 | Matsubara et al. | |
| 2002/0114937 A1 | 8/2002 | Albert et al. | |
| 2002/0144482 A1 | 10/2002 | Henson et al. | |
| 2003/0041612 A1 | 3/2003 | Piloni et al. | |
| 2003/0056334 A1 | 3/2003 | Finkelstein | |
| 2003/0157284 A1 | 8/2003 | Tanimoto et al. | |
| 2003/0167789 A1 | 9/2003 | Tanimoto et al. | |
| 2003/0173883 A1 | 9/2003 | Koons | |
| 2004/0144130 A1 | 7/2004 | Jung | |
| 2004/0226141 A1 | 11/2004 | Yates et al. | |
| 2005/0042247 A1 | 2/2005 | Gomoll et al. | |
| 2005/0229614 A1 | 10/2005 | Ansted | |
| 2006/0064846 A1 | 3/2006 | Espendola et al. | |
| 2006/0261718 A1 | 11/2006 | Miseki et al. | |
| 2006/0266075 A1 | 11/2006 | Itsuki et al. | |
| 2007/0266654 A1 | 11/2007 | Noale | |
| 2008/0044488 A1 | 2/2008 | Zimmer et al. | |
| 2008/0048540 A1 | 2/2008 | Kim | |
| 2008/0138458 A1 | 6/2008 | Ozasa et al. | |
| 2008/0196441 A1 | 8/2008 | Ferreira | |
| 2008/0257759 A1 | 10/2008 | Stone et al. | |
| 2009/0032541 A1 | 2/2009 | Rogala et al. | |
| 2009/0131571 A1 | 5/2009 | Fraser et al. | |
| 2009/0205357 A1 | 8/2009 | Lim et al. | |
| 2009/0302728 A1 | 12/2009 | Rotter et al. | |
| 2009/0322470 A1 | 12/2009 | Yoo et al. | |
| 2010/0206464 A1 | 8/2010 | Heo et al. | |
| 2010/0218543 A1 | 9/2010 | Duchame | |
| 2010/0287843 A1 | 11/2010 | Oh | |
| 2010/0287974 A1 | 11/2010 | Cur et al. | |
| 2011/0011119 A1 | 1/2011 | Kuehl et al. | |
| 2011/0023527 A1 | 2/2011 | Kwon et al. | |
| 2011/0095669 A1 | 4/2011 | Moon et al. | |
| 2011/0215694 A1 | 9/2011 | Fink et al. | |
| 2011/0220662 A1 | 9/2011 | Kim et al. | |
| 2011/0309732 A1 | 12/2011 | Horil et al. | |
| 2012/0011879 A1 | 1/2012 | Gu | |
| 2012/0060544 A1 | 3/2012 | Lee et al. | |
| 2012/0099255 A1 | 4/2012 | Lee et al. | |
| 2012/0202049 A1 | 8/2012 | Valladeau et al. | |
| 2012/0240612 A1 | 9/2012 | Wusthoff et al. | |
| 2012/0280608 A1 | 11/2012 | Park et al. | |
| 2013/0026900 A1 | 1/2013 | Oh et al. | |
| 2013/0039059 A1 * | 2/2013 | Montgermont | E06B 3/66 362/235 |
| 2013/0043780 A1 | 2/2013 | Ootsuka et al. | |
| 2013/0221819 A1 | 8/2013 | Wing | |
| 2013/0270732 A1 | 10/2013 | Wu et al. | |
| 2013/0285527 A1 | 10/2013 | Choi et al. | |
| 2013/0293080 A1 | 11/2013 | Kim et al. | |
| 2013/0328472 A1 | 12/2013 | Shim et al. | |
| 2014/0009055 A1 | 1/2014 | Cho et al. | |
| 2014/0015395 A1 | 1/2014 | Anthony et al. | |
| 2014/0047775 A1 | 2/2014 | Litch | |
| 2014/0097733 A1 | 4/2014 | Seo et al. | |
| 2014/0162162 A1 | 6/2014 | Kalika et al. | |
| 2014/0166926 A1 | 6/2014 | Lee et al. | |
| 2014/0190978 A1 | 7/2014 | Bowman et al. | |
| 2014/0196305 A1 | 7/2014 | Smith | |
| 2014/0216706 A1 | 8/2014 | Melton et al. | |
| 2014/0232250 A1 | 8/2014 | Kim et al. | |
| 2014/0311667 A1 | 10/2014 | Siudzinski et al. | |
| 2014/0346942 A1 | 11/2014 | Kim et al. | |
| 2015/0011668 A1 | 1/2015 | Kolb et al. | |
| 2015/0015133 A1 | 1/2015 | Carbajal et al. | |
| 2015/0017386 A1 | 1/2015 | Kolb et al. | |
| 2015/0047624 A1 | 2/2015 | Luckhardt et al. | |
| 2015/0059399 A1 | 3/2015 | Hwang et al. | |
| 2015/0115790 A1 | 4/2015 | Pgg | |
| 2015/0159936 A1 | 6/2015 | Oh et al. | |
| 2015/0176888 A1 | 6/2015 | Cur et al. | |
| 2015/0184923 A1 | 7/2015 | Jeon | |
| 2015/0190840 A1 | 7/2015 | Muto et al. | |
| 2015/0224685 A1 | 8/2015 | Amstutz | |
| 2015/0241115 A1 | 8/2015 | Strauss et al. | |
| 2015/0241118 A1 | 8/2015 | Wu | |
| 2015/0285551 A1 | 10/2015 | Aiken et al. | |
| 2016/0084567 A1 | 3/2016 | Fernandez et al. | |
| 2016/0116100 A1 | 4/2016 | Thiery et al. | |
| 2016/0123055 A1 | 5/2016 | Ueyama | |
| 2016/0161175 A1 | 6/2016 | Benold et al. | |
| 2016/0178267 A1 | 6/2016 | Hao et al. | |
| 2016/0178269 A1 | 6/2016 | Hiemeyer et al. | |
| 2016/0235201 A1 | 8/2016 | Soot | |
| 2016/0240839 A1 | 8/2016 | Umeyama et al. | |
| 2016/0258671 A1 | 9/2016 | Allard et al. | |
| 2016/0290702 A1 | 10/2016 | Sexton et al. | |
| 2016/0348957 A1 | 12/2016 | Hitzelberger et al. | |
| 2017/0028938 A1 * | 2/2017 | Yoshida | B60J 10/88 |
| 2017/0038126 A1 | 2/2017 | Lee et al. | |
| 2017/0157809 A1 | 6/2017 | Deka et al. | |
| 2017/0159942 A1 | 6/2017 | Ivanovic et al. | |
| 2017/0176086 A1 | 6/2017 | Kang | |
| 2017/0184339 A1 | 6/2017 | Liu et al. | |
| 2017/0191746 A1 | 7/2017 | Seo | |
| 2019/0101320 A1 | 4/2019 | Dherde et al. | |

FOREIGN PATENT DOCUMENTS

| | | |
|---|---|---|
| CN | 102717578 A | 10/2012 |
| CN | 202973713 U | 6/2013 |
| CN | 104816478 A | 8/2015 |
| CN | 105115221 | 12/2015 |
| CN | 2014963379 U | 1/2016 |
| DE | 3208686 C2 | 4/1991 |
| DE | 4110292 A1 | 10/1992 |
| DE | 4409091 | 9/1995 |
| DE | 19520020 | 12/1996 |
| DE | 19914105 | 9/2000 |
| DE | 19948361 | 4/2001 |
| DE | 102011051178 A1 | 12/2012 |

(56) References Cited

FOREIGN PATENT DOCUMENTS

| | | |
|---|---|---|
| DE | 102015222224 A1 | 5/2017 |
| EP | 0645576 A1 | 3/1995 |
| EP | 1602425 A1 | 12/2005 |
| EP | 1624263 A2 | 8/2006 |
| EP | 1344008 | 9/2006 |
| EP | 1338854 | 12/2009 |
| EP | 2543942 A2 | 1/2013 |
| EP | 2801774 | 11/2014 |
| EP | 2878427 A1 | 6/2015 |
| FR | 2991698 A1 | 12/2013 |
| JP | 58168875 A | 10/1983 |
| JP | 131880 | 12/1989 |
| JP | 04165197 | 10/1992 |
| JP | 04309778 A | 11/1992 |
| JP | 8145547 | 6/1996 |
| JP | 11159693 A | 6/1999 |
| JP | 2000097390 | 4/2000 |
| JP | 20000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3438948 B2 | 8/2003 |
| JP | 3478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006-77792 | 3/2006 |
| JP | 2006161834 A | 6/2006 |
| JP | 2006161945 | 6/2006 |
| JP | 8792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 4545126 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 4779684 | 9/2011 |
| JP | 2011196644 | 10/2011 |
| JP | 2012026493 | 2/2012 |
| JP | 4897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 20080103845 | 11/2008 |
| KR | 20090026045 | 3/2009 |
| KR | 1017776 | 2/2011 |
| KR | 101017776 | 2/2011 |
| KR | 20120007241 | 1/2012 |
| KR | 20120046621 | 5/2012 |
| KR | 20120051305 | 5/2012 |
| KR | 20150089495 A | 8/2015 |
| RU | 2061925 C1 | 6/1996 |
| RU | 2077411 C1 | 4/1997 |
| RU | 2081858 | 6/1997 |
| RU | 2132522 C2 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2006120198 | 11/2006 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 547614 | 5/1977 |
| SU | 648780 A1 | 2/1979 |
| SU | 01307186 A1 | 4/1987 |
| WO | 9614207 A1 | 5/1996 |
| WO | 1996032605 | 10/1996 |
| WO | 9721767 | 6/1997 |
| WO | 1998049506 | 11/1998 |
| WO | 9920961 A1 | 4/1999 |
| WO | 9920964 | 4/1999 |
| WO | 1999020964 | 4/1999 |
| WO | 0160598 | 8/2001 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 2003089729 | 10/2003 |
| WO | 2004010042 A1 | 1/2004 |
| WO | 2006045694 | 5/2006 |
| WO | 2006073540 A2 | 7/2006 |
| WO | 2006120183 | 11/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 A2 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2012023705 | 2/2012 |
| WO | 2012026715 | 3/2012 |
| WO | 2012031885 | 3/2012 |
| WO | 2012043990 | 4/2012 |
| WO | 2012044001 | 4/2012 |
| WO | 2012085212 | 6/2012 |
| WO | 2012119892 | 9/2012 |
| WO | 2012152646 A2 | 11/2012 |
| WO | 2013116103 | 8/2013 |
| WO | 2013116302 | 8/2013 |

(56) References Cited

FOREIGN PATENT DOCUMENTS

| WO | 2014038150 | 3/2014 |
|---|---|---|
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |
| WO | 2018199980 A1 | 11/2018 |

OTHER PUBLICATIONS

Raszewski et al., "Methods For Producing Hollow Glass Microspheres," Powerpoint, cached from Google, Jul. 2009, 6 pages.

* cited by examiner

TRIM BREAKER FOR A STRUCTURAL CABINET THAT INCORPORATES A STRUCTURAL GLASS CONTACT SURFACE

CROSS-REFERENCE TO RELATED APPLICATION

The present application is a divisional of U.S. patent application Ser. No. 17/126,134, filed Dec. 18, 2020, now U.S. Pat. No. 11,543,172, which is a divisional of U.S. patent application Ser. No. 16/278,408 filed Feb. 18, 2019, now U.S. Pat. No. 10,907,891, both of which are entitled "TRIM BREAKER FOR A STRUCTURAL CABINET THAT INCORPORATES A STRUCTURAL GLASS CONTACT SURFACE," the entire disclosures of which is hereby incorporated herein by reference.

FIELD OF THE DEVICE

The device is in the field of structural cabinets for appliances, and more specifically, a trim breaker for a structural cabinet that includes a glass and steel trim breaker that connects the inner liner and the outer wrapper.

BRIEF SUMMARY OF THE DEVICE

According to one aspect of the present disclosure, a refrigerating appliance includes an inner liner, an outer wrapper and a trim breaker extending between the inner liner and the outer wrapper to define an insulating cavity therebetween. The trim breaker includes a liner portion coupled with the inner liner, a wrapper portion coupled to the outer wrapper and an outer glazing member that extends between the liner and wrapper portions. An external surface of the outer glazing member defines a contact surface that is configured to receive a seal of an operable panel in a closed position.

According to another aspect of the present disclosure, a structural cabinet for an appliance includes an outer glazing member, an inner glazing member offset from the outer glazing member and an inner liner and an outer wrapper that cooperatively define a glazing receptacle. The outer glazing member engages an outer portion of the glazing receptacle and the inner glazing member engages an inner portion of the glazing receptacle.

According to yet another aspect of the present disclosure, a trim breaker for an appliance cabinet includes a metallic liner portion that is configured to attach to an inner liner, a metallic wrapper portion that is configured to attach to an outer wrapper and inner and outer glazing members that extend between the liner and wrapper portions. The outer glazing member is configured to define a contact surface that receives an operable panel in a closed position and the inner glazing member is configured to partially define an insulating cavity.

These and other features, advantages, and objects of the present disclosure will be further understood and appreciated by those skilled in the art by reference to the following specification, claims, and appended drawings.

Figure 1:
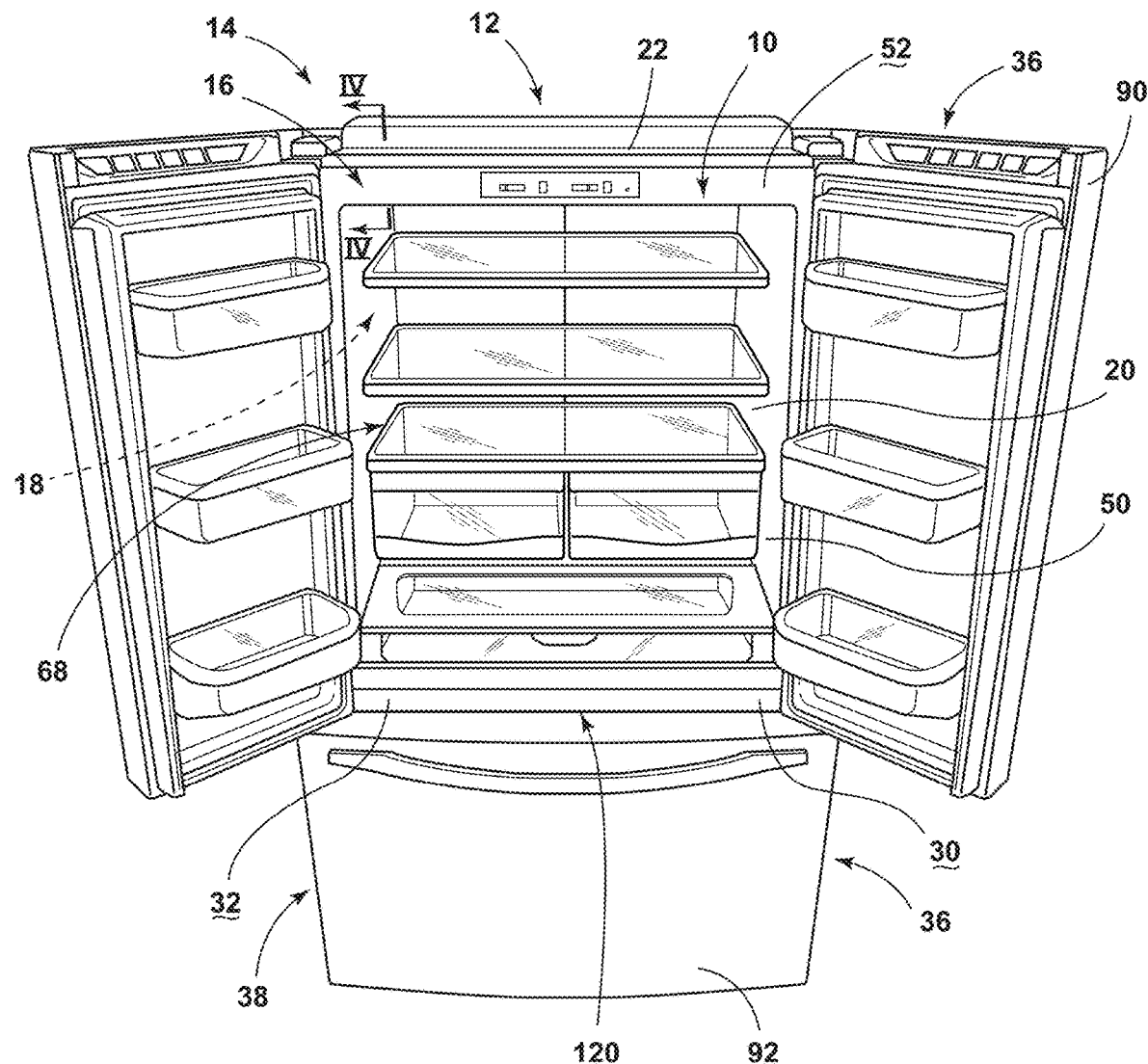
FIG. 1 is a front perspective view of an appliance that incorporates a structural cabinet having the glass and steel trim breaker.
Figure 2:
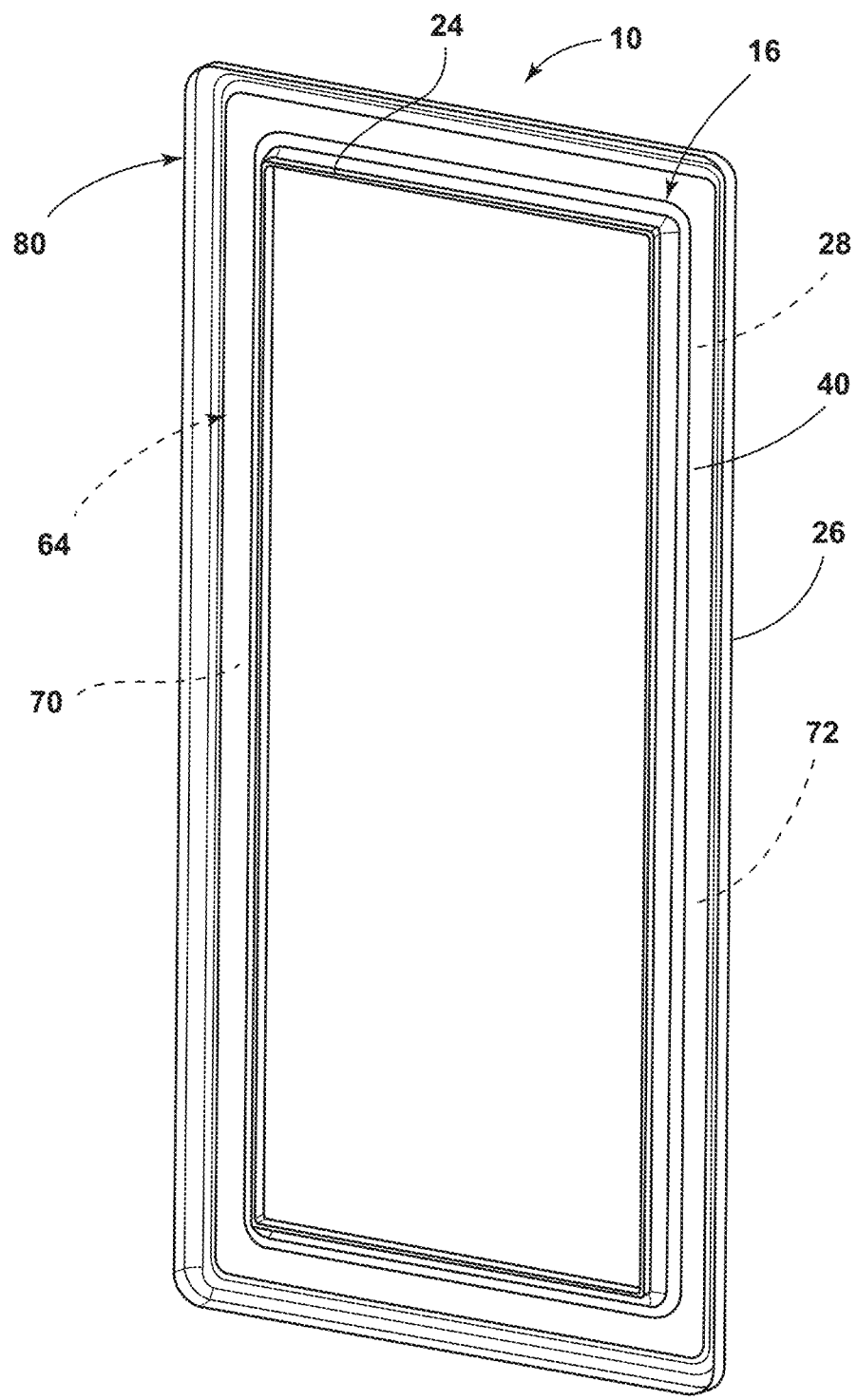
FIG. 2 is a rear perspective view of an aspect of the glass and steel trim breaker.
Figure 3:
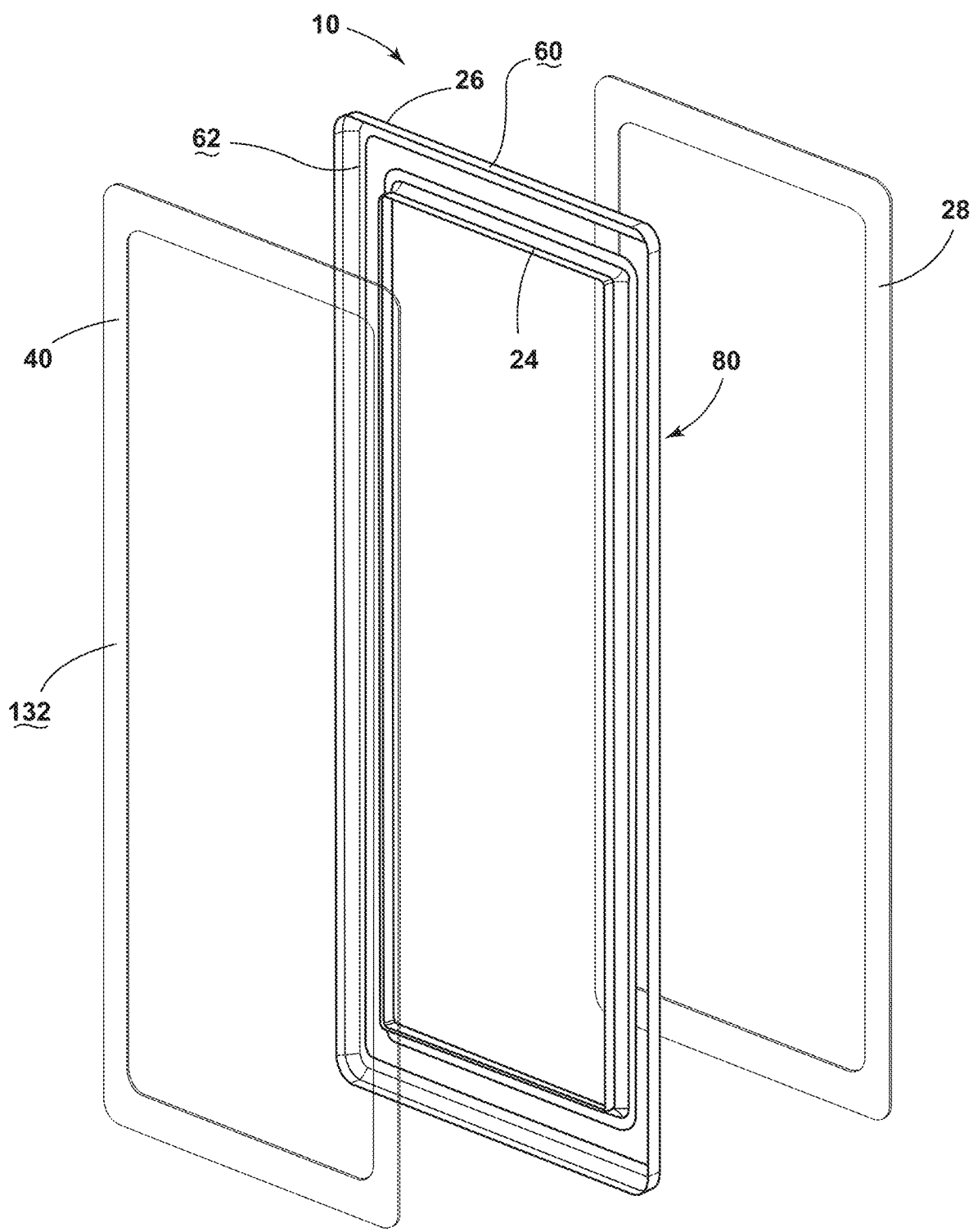
FIG. 3 is an exploded perspective view of the glass and steel trim breaker of FIG. 2.

The components in the figures are not necessarily to scale, emphasis instead being placed upon illustrating the principles described herein.

DETAILED DESCRIPTION

The present illustrated embodiments reside primarily in combinations of method steps and apparatus components related to a trim breaker for an appliance cabinet. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-6, reference numeral 10 generally refers to a trim breaker used in connection with a structural cabinet 12 for an appliance 14, where the trim breaker 10 includes at least one structural glass member 16 for partially supporting the structural cabinet 12 and defining an insulating cavity 18 therein. According to various aspects of the device, the structural cabinet 12 for an appliance 14, such as a refrigerating appliance 14, includes an inner liner 20 and an outer wrapper 22 to define an insulating cavity 18 therebetween. The trim breaker 10 includes a liner portion 24 that is coupled with an inner liner 20 and a wrapper portion 26 that is coupled with the outer wrapper 22. The structural glass member 16 can include an outer glazing member 28 that extends between the liner and wrapper portions 24, 26. An external surface 30 of the outer glazing member 28 defines the contact surface 32 that is configured to receive a seal of an operable panel 36, when the operable panel 36 is in a closed position 38. It is contemplated that the structural glass member 16 of the trim breaker 10 can also include an inner glazing member 40 that is coupled to the liner and wrapper portions 24, 26. An interior surface 132 of the inner glazing member 40 is configured to partially define the insulating cavity 18 within the structural cabinet 12.

According to various aspects of the device, the inner liner 20 and the outer wrapper 22 are typically metallic members that form the outer walls 50 of the structural cabinet 12. The liner and wrapper portions 24, 26 of the trim breaker 10 are also metallic, typically steel, and can be welded to the inner liner 20 and outer wrapper 22 to form an airtight or substantially airtight seal at the location of the trim breaker 10. The outer and inner glazing members 28, 40 are then attached to the liner and wrapper portions 24, 26 and define an edge surface 52 of the structural cabinet 12. As discussed above, this edge surface 52 of the structural cabinet 12 is typically in the form of a contact surface 32 that receives one or more operable panels 36 in a closed position 38.

As exemplified in FIGS. 2-6, the outer glazing member 28 typically engages an outer surface 60 of the liner and wrapper portions 24, 26. In this manner, the outer glazing member 28 can define a contact surface 32 for the trim breaker 10 and for the structural cabinet 12. The inner glazing member 40 typically engages an inner surface 62 of the liner and wrapper portions 24, 26. Through this engagement, the outer glazing member 28 is offset from the inner glazing member 40 to define an interstitial space 64 therebetween. This interstitial space 64 can be used as an insulating space 66 of the trim breaker 10 for slowing or limiting the transfer of heat 112 from areas outside of the structural cabinet 12 to insulated compartments 68 within the structural cabinet 12. To provide additional insulation at the trim breaker 10, the interstitial space 64 defined between the outer glazing member 28 and the inner glazing member 40 can be defined by an at least partial vacuum 70. It is contemplated that this interstitial space 64 can include an insulating material 72. This insulating material 72 can include, but is not limited to, one or more insulating gasses, foam insulation, fumed silica, precipitated silica, other silica-based material, perlite, glass spheres, hollow glass spheres, combinations thereof and other similar insulating materials 72.

Referring again to FIGS. 1-6, the liner and wrapper portions 24, 26 of the trim breaker 10 can be welded to the inner liner 20 and outer wrapper 22. In this manner, the liner and wrapper portions 24, 26 as well as the inner liner 20 and outer wrapper 22 can be made of steel, alloys thereof, or other similar metallic material that can form a welded connection. The outer and inner glazing members 28, 40 can be bonded, welded or otherwise attached to the liner and wrapper portions 24, 26 of the trim breaker 10 via various connecting mechanisms and methods. The outer and inner glazing members 28, 40 can be attached to the liner and wrapper portions 24, 26 via various bonding adhesives that can include a polymer glazing such as butyl, frit soldering, epoxy, silicone, various sealants, and other similar bond adhesives. It is also contemplated that the outer and inner glazing members 28, 40 can be attached to the liner and wrapper portion 24, 26 via glass welding, typically used in combination with one or more sealant materials.

According to various aspects of the device, the outer and inner glazing members 28, 40 can be made of various materials. These materials can include, but are not limited to, glass, tempered glass, ceramic, combinations thereof, and other similar glazing materials that can be used in structural applications. In various aspects, the material of the outer glazing member 28 may be the same material as that of the inner glazing member 40. The outer and inner glazing members 28, 40 may also be made of different materials. Because the outer and inner glazing members 28, 40 are positioned at different locations and may engage different materials, the different materials may be selected to address the differing conditions experienced by the outer and inner glazing members 28, 40.

Through the use of the outer and inner glazing members 28, 40, the structural cabinet 12 can experience reduced permeation of gas through the area of the trim breaker 10, when compared to trim breakers 10 that are made of plastic or other similar polymer-type material. The use of the outer and inner glazing members 28, 40 also provide resistance to large thermal strain that may be experienced over a large temperature range. These temperatures may be experienced during use of the appliance 14, such as where a refrigerator is stored in a garage or other outdoor or semi-outdoor area. These extreme temperatures are also experienced during manufacture, transport, and storage of the appliance 14.

By way of example, where a particular appliance 14 is transported or stored in a metal container, the temperatures within these containers can regularly exceed 45° C. or more. In these extreme temperatures, conventional plastic or polymer trim members may experience greater degrees of gas permeation through the material of the conventional trim member that can result in a degradation of the vacuum contained within the insulating cavity 18. These extreme temperatures can also result in a structural weakening of the plastic and polymer material of conventional trim members.

Using the trim breaker 10 that contains the metallic liner and wrapper portions 24, 26 and the outer and inner glazing members 28, 40, greater resistance to gas permeation is achieved as well as greater resistance to thermal strain over large temperature ranges. Additionally, glass and steel can be relatively inexpensive materials to manufacture and also work with during manufacture of a particular structural cabinet 12. Accordingly, using the various aspects of the trim breaker 10 disclosed herein, the use of welding techniques and relatively convenient bonding geometry for forming the trim breaker 10, and also attaching a trim breaker 10 to the remainder of the structural cabinet 12 can achieve cost savings, faster production time and use of fewer resources.

Referring again to FIGS. 1-6, the structural cabinet 12 for the appliance 14 can include the outer glazing member 28 and the inner glazing member 40 that is offset from the outer glazing member 28. The inner liner 20 and the outer wrapper 22 cooperatively define a glazing receptacle 80. This glazing receptacle 80 can be in the form of the liner portion 24 and wrapper portion 26 that are welded to the inner liner 20 and outer wrapper 22, respectively. During manufacture, it is contemplated that the liner portion 24 and wrapper portion 26 can be welded to the inner liner 20 and outer wrapper 22, and then subsequently the outer and inner glazing members 28, 40 can be adhered to the liner and wrapper portions 24, 26 that form the glazing receptacle 80.

In alternative aspects of the device, it is contemplated that the trim breaker 10 can be formed where the outer and inner glazing members 28, 40 are adhered to the liner and wrapper portions 24, 26 in one assembly location. This trim breaker 10, in the form of an assembly, can then be attached to the inner liner 20 and outer wrapper 22 as a subsequent manufacturing step in forming the structural cabinet 12.

During the formation of the trim breaker 10, the outer glazing member 28 typically engages an outer portion of the glazing receptacle 80 and the inner glazing member 40 engages an inner portion of the glazing receptacle 80. Through this configuration, the outer and inner glazing members 28, 40 can be offset from one another to form the interstitial space 64 therebetween. As discussed above, this interstitial space 64 can be used as an additional insulating feature of the structural cabinet 12 that may be maintained at an at least partial vacuum 70. This interstitial space 64 can also be filled or partially filled with an insulating material 72 similar to those materials described above.

As exemplified in FIGS. 2-6, the outer glazing member 28 is typically configured to define a contact surface 32 that is used to receive a magnetic seal 34 of an operable panel 36 for the appliance 14, such as a door 90 or drawer 92. Through this configuration, the magnetic seal 34 for the operable panel 36 engages the smooth contact surface 32 of the outer glazing member 28 to define a substantially consistent seal at the contact surface 32. According to various aspects of the device, the interstitial space 64 defined between the outer and inner glazing members 28, 40 can include a magnetic material 100 that can be used to magnetically engage a magnet 104 defined within the magnetic seal 34 of the operable panel 36. This magnetic material 100 can be a type of magnet 104 or can be a ferromagnetic material 102 that is disposed within the interstitial space 64.

Figure 5:
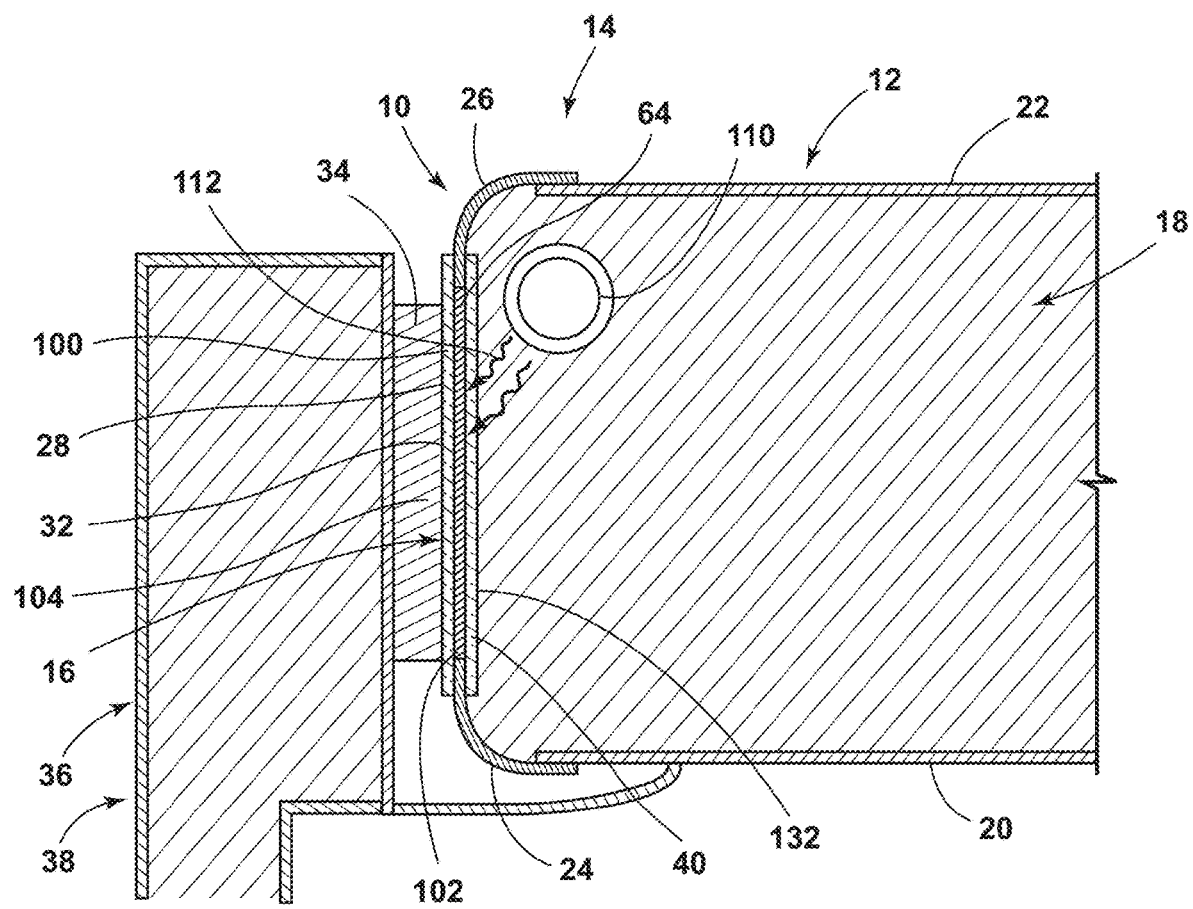
FIG. 5 is a schematic cross-sectional view of an appliance cabinet showing the interface between the glass and steel trim breaker and an operable panel in a closed position.

As exemplified in FIG. 5, the structural cabinet 12 can include a heat loop 110 that runs through a portion of the structural cabinet 12 near the trim breaker 10. This heat loop 110 is used to provide a heating function that emits heat 112 toward the contact surface 32 of the structural cabinet 12. Heat 112 provided to the contact surface 32 by the heat loop 110 is used to prevent condensation from forming on the contact surface 32. This condensation can result from a temperature difference that may exist between the surface of the structural cabinet 12 and the areas surrounding the exterior of the structural cabinet 12. If condensation forms on the contact surface 32, this condensation can accumulate and pool in an area on the floor in front of the appliance 14. Using the heat loop 110, the contact surface 32 can be at least partially heated to minimize any temperature difference and prevent the accumulation of condensation on the contact surface 32.

Figure 7:
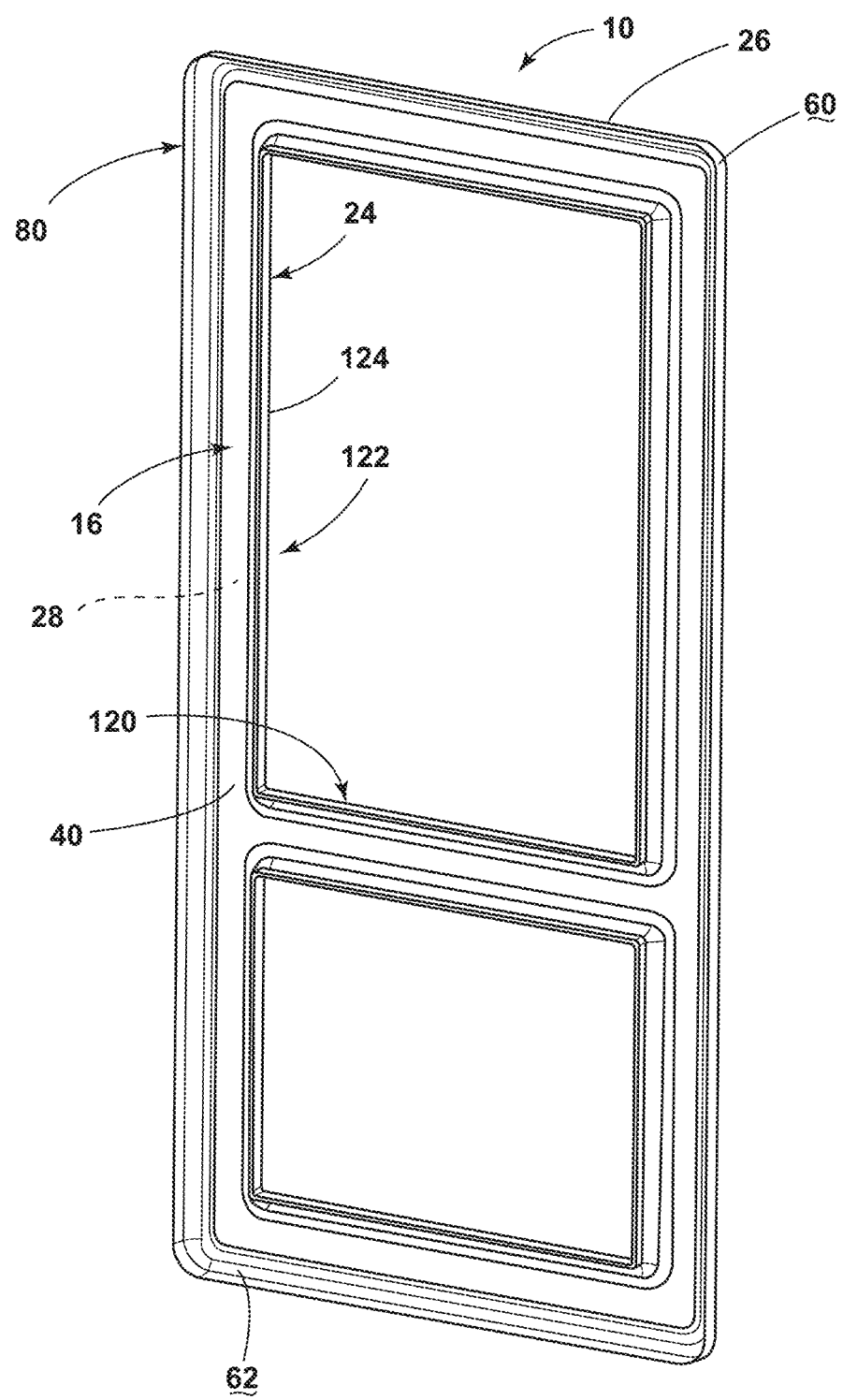
FIG. 7 is a perspective view of the glass and steel trim breaker used in connection with a structural cabinet having an interior mullion.
Figure 8:
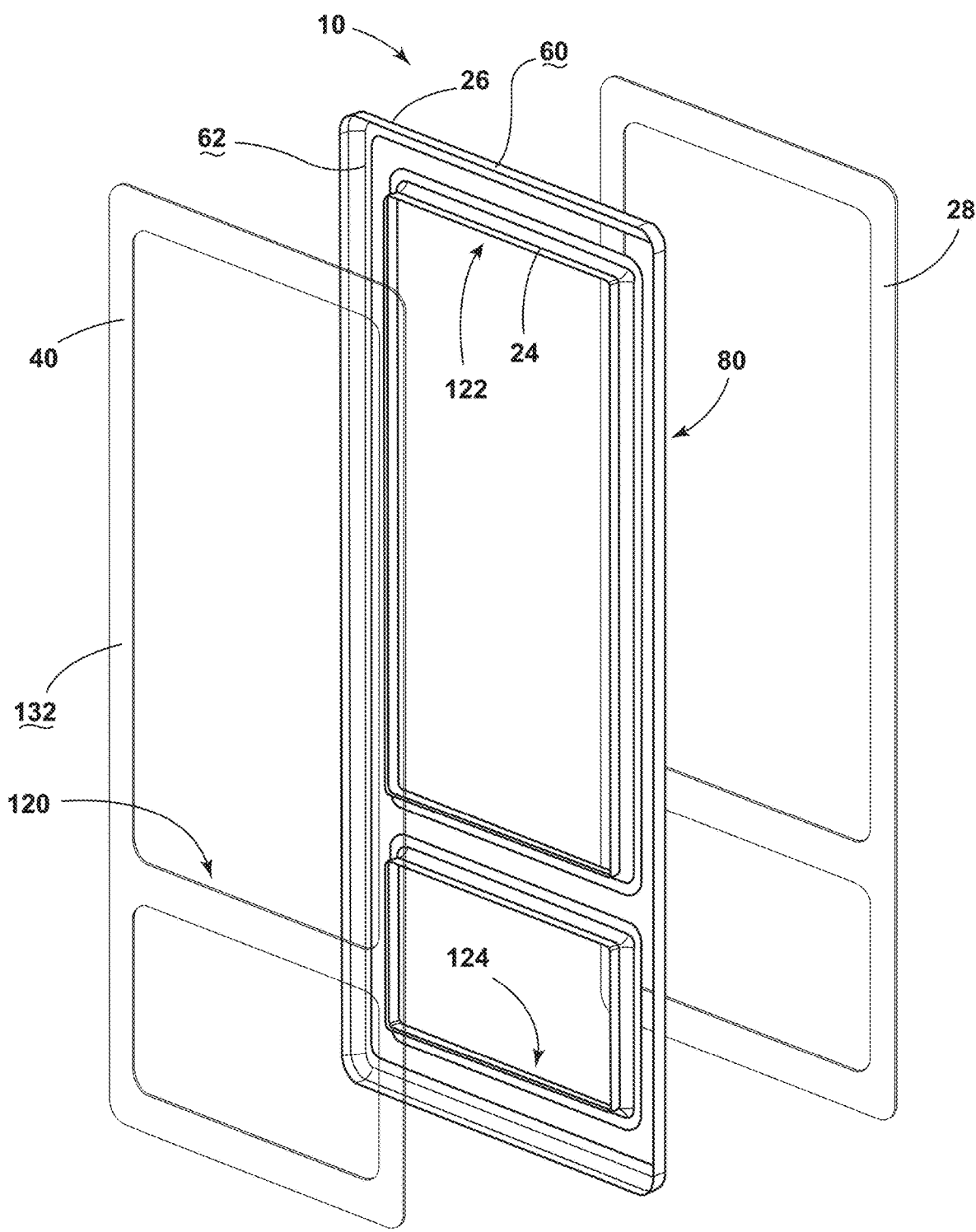
FIG. 8 is an exploded perspective view of the glass and steel trim breaker of FIG. 7.

Referring now to FIGS. 1, 7 and 8, the trim breaker 10 that is formed by the outer and inner glazing members 28, 40 that are bonded or adhered to the liner and wrapper portions 24, 26 can include a mullion member 120 that extends through a central area of the trim breaker 10. In forming this trim breaker 10 having the mullion member 120, the trim breaker 10 can include a single wrapper portion 26 that extends around the perimeter of the trim breaker 10. The liner portion 24 of the trim breaker 10 can include multiple separate aperture members 122 that can be used to define apertures 124 for accessing separate insulated compartments 68 that will be defined within the appliance 14. The outer and inner glazing members 28, 40 can then be positioned between the wrapper portion 26 and the two or more aperture members 122 of the liner portion 24 to form the trim breaker 10 having at least one mullion member 120. Where the mullion member 120 is included, the wrapper portion 26 of the trim breaker 10 is welded to the outer wrapper 22. Each aperture member 122 of the liner portion 24 can be welded to a respective inner liner 20 that forms each insulated compartment 68 of the appliance 14.

Referring again to FIGS. 2 and 3, the trim breaker 10 that is formed by the liner and wrapper portions 24, 26 and the outer and inner glazing members 28, 40 can be used to define a trim breaker 10 for an insulated operable panel 36. In such an embodiment, the trim breaker 10 can be used to define the location of the operable panel 36 where the magnetic seal 34 is attached. Similar to the structural cabinet 12, the operable panel 36 can include an inner liner 20 and an outer wrapper 22 that are each welded to the wrapper and liner portions 26, 24, respectively, to define an insulating cavity 18 within the operable panel 36. The trim breaker 10 having the outer and inner glazing members 28, 40 can be used to define the trim breaker 10 that extends between the inner liner 20 and the outer wrapper 22.

Figure 4:
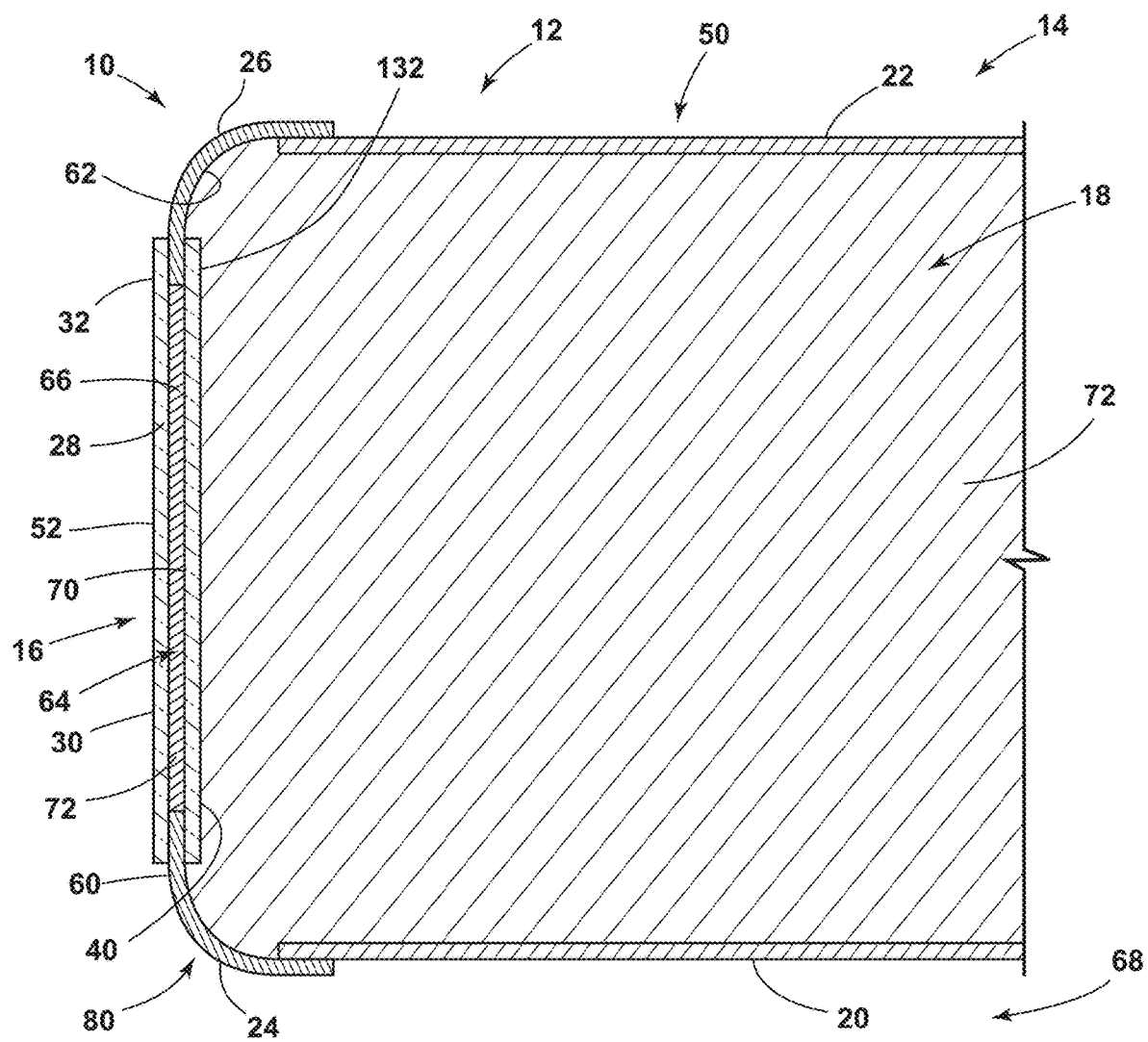
FIG. 4 is a schematic cross-sectional view of the structural cabinet of FIG. 1, taken along line IV-IV and showing engagement of the glass and steel trim breaker with the metallic inner liner and the metallic outer wrapper.
Figure 6:
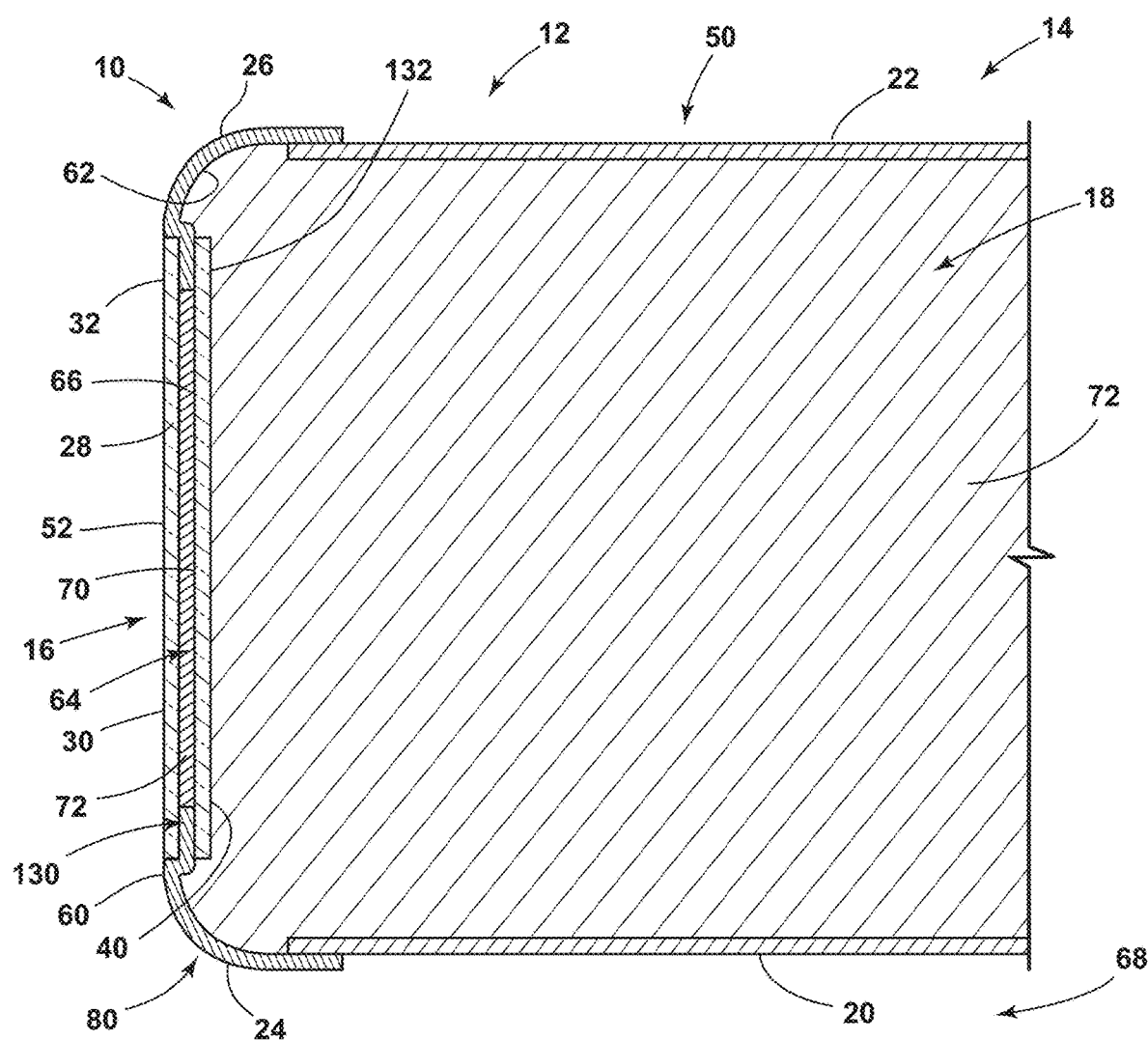
FIG. 6 is an alternative cross-sectional view of the structural cabinet of FIG. 1.

As exemplified in FIGS. 4 and 6, the glazing receptacle 80 that is defined by the liner and wrapper portions 24, 26 of the trim breaker 10 can include various geometries that can be used to extend between the inner and outer glazing members 40, 28 and the inner liner 20 and outer wrapper 22. Various fillets, chamfers, and other similar rounded geometries can be used to extend between the outer and inner glazing members 28, 40 and the inner liner 20 and outer wrapper 22. Additionally, the liner and wrapper portions 24, 26 of the trim breaker 10 can include a recessed portion 130 that is configured to receive the outer glazing member 28 in a substantially flush configuration with the outer surface 60 of the liner and wrapper portions 24, 26. It is also contemplated that the outer glazing member 28 can be attached to the liner and wrapper portions 24, 26 and stand proud of the liner and wrapper portions 24, 26. In such a configuration, the outer glazing member 28 may include rounded or angled edges that can be incorporated to prevent nicks, chips, and scratches from occurring within outer edges of the outer glazing member 28.

As exemplified in FIGS. 4-6, the structural cabinet 12 can include an insulating material 72 that is disposed within the insulating cavity 18. This insulating material 72 can be any one of various materials that can include, but are not limited to, one or more insulating gasses, foam insulation, fumed silica, precipitated silica, other silica-based material, perlite, glass spheres, hollow glass spheres, combinations thereof and other similar insulating materials 72. It is contemplated that these insulating materials 72 contained within the insulating cavity 18 defined by the structural cabinet 12 can substantially fill the entire insulating cavity 18. In this manner, the insulating material 72 can directly engage the interior surface 132 of the inner glazing member 40.

According to various aspects of the device, the trim breaker 10 disclosed herein incorporates the at least one structural glass member 16 to be used within various appliances 14. Such appliances 14 can include, but are not limited to, refrigerators, freezers, coolers, ovens, dishwashers, laundry appliances, small appliances, combinations thereof, and other similar commercial and residential appliances and fixtures.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance trim breaker comprising:
    a metallic liner portion that attaches to an inner liner;
    a metallic wrapper portion that attaches to an outer wrapper; and
    inner and outer glazing members that extend between the metallic liner portion and the metallic wrapper portion, wherein the outer glazing member defines a contact surface that is configured to receive an operable panel in a closed position and the inner glazing member is configured to partially define an insulating cavity wherein the inner glazing member is at least one of glass plate or ceramic plate and the outer glazing member is at least one of glass plate or ceramic plate.

2. The appliance trim breaker of claim 1, wherein the outer and inner glazing members define an interstitial space therebetween.

3. The appliance trim breaker of claim 2, wherein the interstitial space defines an at least partial vacuum.

4. The appliance trim breaker of claim 2, wherein the interstitial space defines a partial vacuum and includes one or more insulating gasses.

5. The appliance trim breaker of claim 2, wherein the interstitial space includes an insulating material.

6. The appliance trim breaker of claim 5, wherein the insulating material includes an insulating gas.

7. The appliance trim breaker of claim 5, wherein the insulating material includes at least one of insulating gas and a foam insulation.

8. The appliance trim breaker of claim 5, wherein the insulating material includes at least one of fumed silica and precipitated silica.

9. The appliance trim breaker of claim 5, wherein the insulating material includes at least one of perlite, glass spheres, and hollow glass spheres.

10. The appliance trim breaker of claim 1, wherein the inner glazing member is tempered glass.

11. The appliance trim breaker of claim 1, wherein the outer glazing member is glass.

12. The appliance trim breaker of claim 1, wherein the inner glazing member and the outer glazing member are made of different materials.

13. The appliance trim breaker of claim 1, wherein the metallic liner portion is made of at least one of steel and a steel alloy.

14. The appliance trim breaker of claim 1, wherein the metallic wrapper portion is made of at least one of steel and a steel alloy.

15. The appliance trim breaker of claim 1, wherein the outer glazing member engages an outer surface of the metallic wrapper portion and an outer surface of the metallic wrapper portion.

16. The appliance trim breaker of claim 1, wherein the inner glazing member engages an inner surface of the metallic wrapper portion and an inner surface of the metallic liner portion.

17. The appliance trim breaker of claim 1, wherein the metallic wrapper portion is configured to be welded to the outer wrapper.

18. The appliance trim breaker of claim 1, wherein the metallic liner portion is one of welded and adhered to the inner liner.

* * * * *